United States Patent [19]

Fujino et al.

[11] Patent Number: 4,564,679
[45] Date of Patent: Jan. 14, 1986

[54] CHROMOGENIC COMPOUNDS

[75] Inventors: Yoshiharu Fujino; Hajime Kawai; Yasushi Nakai; Katsuhiko Tsunemitsu, all of Kyoto, Japan

[73] Assignee: Yamada Chemical Co., Ltd., Kyoto, Japan

[21] Appl. No.: 388,935

[22] Filed: Jun. 16, 1982

[30] Foreign Application Priority Data

Jun. 23, 1981 [JP] Japan ................... 56-98662

[51] Int. Cl.$^4$ ........................... C07D 471/02
[52] U.S. Cl. ................................ 546/116
[58] Field of Search ........................ 546/116

[56] References Cited

U.S. PATENT DOCUMENTS

| | | | |
|---|---|---|---|
| 3,775,424 | 11/1973 | Farber | 546/116 |
| 3,853,869 | 12/1974 | Farber | 546/116 |
| 4,191,827 | 3/1980 | Nadelson | 546/116 |
| 4,275,905 | 6/1981 | Miller | 546/116 |
| 4,299,411 | 11/1981 | Brockett | 546/116 |

FOREIGN PATENT DOCUMENTS

| | | | |
|---|---|---|---|
| 5116197 | 5/1973 | Japan | 546/116 |
| 2039934 | 8/1980 | United Kingdom | 546/116 |
| 2040303 | 8/1980 | United Kingdom | 546/116 |

OTHER PUBLICATIONS

Fieser & Fieser, Organic Chemistry, D. C. Heath & Co., Boston, 3rd Edition, p. 46.

Primary Examiner—Henry R. Jiles
Assistant Examiner—Robert C. Whittenbaugh
Attorney, Agent, or Firm—Finnegan, Henderson, Farabow, Garrett & Dunner

[57] ABSTRACT

The chromogenic azaphthalide compounds of the invention are of the formula:

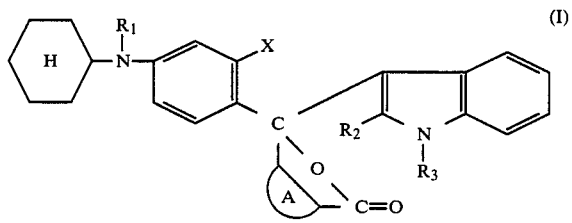

wherein A is a pyridine ring; $R_1$ is hydrogen atom or alkyl radicals of from one to 4 carbon atoms; X is hydrogen atom, alkyl radicals of from one to 2 carbon atoms or alkoxy radicals of from one to 2 carbon atoms; $R_2$ is alkyl radicals of from one to 2 carbon atoms or phenyl radical; $R_3$ is hydrogen atom or alkyl radicals of from one to 8 carbon atoms.

These compounds are particularly suitable for use in providing high quality pressure- or heat-sensitive copying sheets.

9 Claims, No Drawings

CHROMOGENIC COMPOUNDS

This invention relates to novel chromogenic azaphthalide compounds available as color former in copying (recording) materials.

The novel chromogenic compounds according to the present invention are defined by the following general formula:

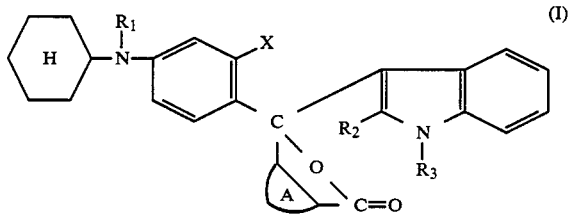
(I)

wherein A is pyridine ring; $R_1$ is hydrogen atom or alkyl radicals of from one to 4 carbon atoms; X is hydrogen atom, alkyl radicals of from one to 2 carbon atoms or alkoxy radicals of from one to 2 carbon atoms; $R_2$ is alkyl radicals of from one to 2 carbon atoms or phenyl radical; $R_3$ is hydrogen atom or alkyl radicals of from one to 8 carbon atoms.

The azaphthalide compounds of the general formula (I) (hereinafter referred to as the present compounds) are substantially colorless in themselves. They, however, have a property such that when they are brought into intimate contact with electron-accepting substances such as active clay substances, for example, acid clay, attapalgite clay, silton clay, bentonite, kaoline and acidic organopolymers, for example, phenol formaline resin, phenol acetylene resin, salicyclic acid formaline resin and Bis-Phenol A, they give rise to colors of the blue group or bluish purple group.

As the chromogenic compounds of prior art which are capable of giving rise to blue to bluish purple colors, leuco-auramine compounds, phthalide compounds, leuco-methylene blue compounds and the like have been known. However, they have various disadvantages. That is, Michler's hydrol, one of the leuco-auramine compounds, is very poor in its stability before color forming and its color forming property exhibited upon application to sheets coated with an acidic organopolymer is poor, particularly with its colored image of poor light-resistivity. Crystal violet lactone, one of the phthalide compounds, has been usually used because of its initial colored image of dark bluish purple, however, its colored image shows extremely low resistivity to light and humidity. In benzoyl leucomethylene blue, one of the leuco-methylene blue compounds, its colored image shows extremely high resistivity to light, but its color forming is very slow and its color forming property exhibited upon application to sheets coated with an acidic organopolymer is very poor.

The chromogenic compounds which have improved the disadvantages and possess structure formulas similar to that of FORMULA (I) include 3-(4-diethylamino-2-ethoxyphenyl)-3-(1-ethyl-2-methylindol-3-yl)-7-azaphthalide, 3-(4-diethylamino-2-ethoxyphenyl)-3-(1-ethyl-2-methylindol-3-yl)-4-azaphthalide and the like. However, their spontaneous color forming property is remarkable.

In a first aspect of the present invention, there is provided a chromogenic compound of the general formula:

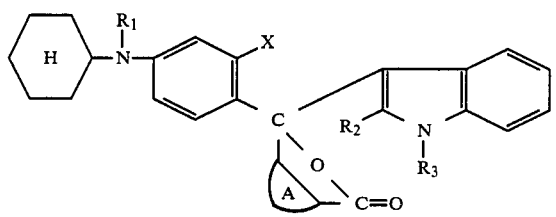

wherein A is a pyridine ring of a 4- or 7-azaphthalide group; $R_1$ is hydrogen atom or alkyl radicals of from one to 4 carbon atoms; X is hydrogen atom, alkyl radicals of from one to 2 carbon atoms or alkoxy radicals of from one to 2 carbon atoms; $R_2$ is alkyl radicals of from one to 2 carbon atoms or phenyl radical; $R_3$ is hydrogen atom or alkyl radicals of from one to 8 carbon atoms.

In a second aspect of the present invention, there is provided a process for the preparation of a chromogenic compound of the formula (I):

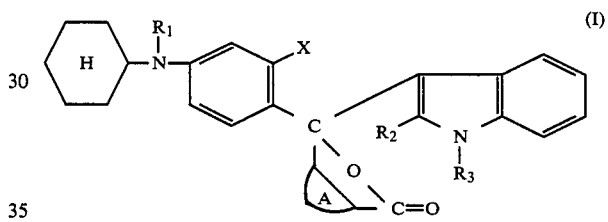
(I)

wherein A is a pyridine ring; $R_1$ is hydrogen atom or alkyl radicals of from one to 4 carbon atoms; X is hydrogen atom, alkyl radicals of from one to 2 carbon atoms or alkoxy radicals of from one to 2 carbon atoms; $R_2$ is alkyl radicals of from one to 2 carbon atoms or phenyl radical; $R_3$ is hydrogen atom or alkyl radicals of from one 8 carbon atoms, comprising condensing a pyridinecarboxylic acid derivative of the formula (II):

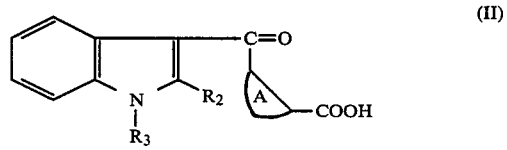
(II)

wherein A, $R_2$ and $R_3$ are defined above, and an alkylaniline derivative of the general formula (III):

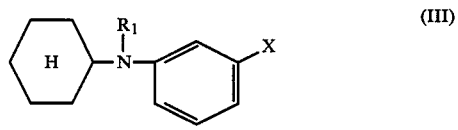
(III)

wherein X and $R_1$ are defined above, in the presence of a condensing agent.

In a third aspect of the present invention, there is provided a process for the preparation of a chromogenic compound of the formula (I):

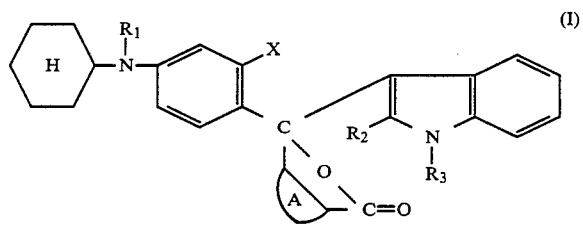

wherein A is a pyridine ring; $R_1$ is hydrogen atom or alkyl radicals of from one to 4 carbon atoms; X is hydrogen atom, alkyl radicals of from one to 2 carbon atoms or alkoxy radicals of from one to 2 carbon atoms; $R_2$ is alkyl radicals of from one to 2 carbon atoms or phenyl radical; $R_3$ is hydrogen atom or alkyl radicals of from one to 8 carbon atoms, comprising condensing an indole derivative of the formula (IV):

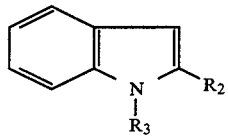

wherein $R_2$ and $R_3$ are defined above, and a pyridinecarboxylic acid derivative of the formula (V):

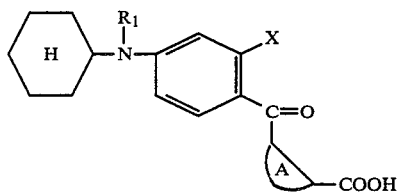

wherein A, X and $R_1$ are defined above, in the presence of a condensing agent.

The present compounds notably excellent in a light-resistivity of colored image and in a resistivity to a spontaneous color forming property, which retain the excellent properties of the known azaphthalide compounds without the disadvantage mentioned above. These compounds, therefore, are fully practicable as color former for pressure-sensitive and heat-sensitive copying sheets.

The present compounds are synthesized by methods to be described below.

A pyridinecarboxylic acid derivative (II) and an alkylaniline derivative (III) are condensed in the presence of a condensing agent such as concentrated aqueous sulfuric acid solution, acetic anhydride and polyphosphoric acid as shown schematically below.

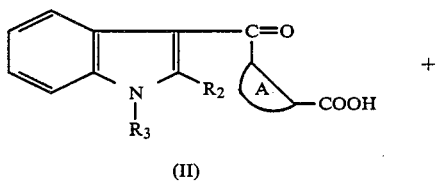

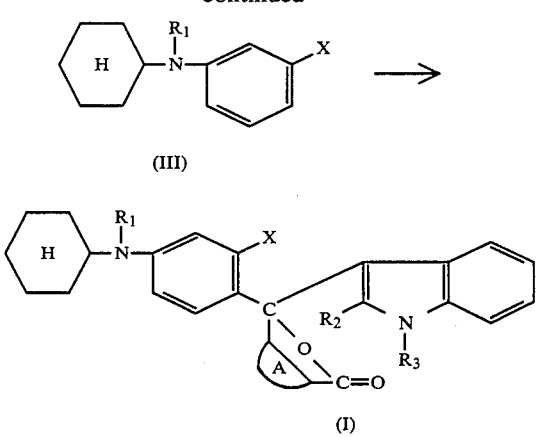

(wherein A, $R_1$, $R_2$, $R_3$ and X are defined previously).

Alternatively, the present compounds are synthesized by condensing a pyridinecarboxylic acid derivative (V) and an indole derivative (IV) in the presence of the condensing agent mentioned above as shown schematically below.

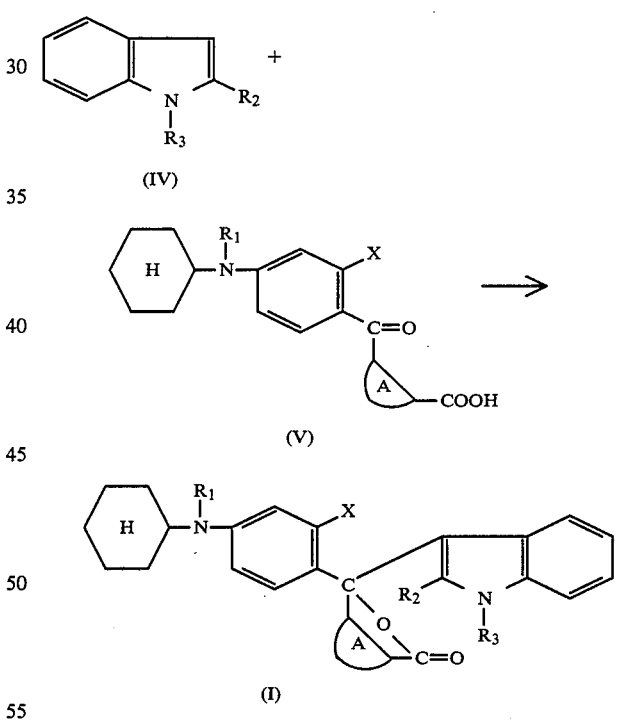

(wherein A, $R_1$, $R_2$, $R_3$ and X are defined previously).

The reaction temperature is 40° to 100° C., preferably 50° to 60° C. The reaction time is 4 to 10 hours, preferably 6 to 8 hours.

The pyridinecarboxylic acid derivative (II) is obtained by bringing indole derivative (IV) and quinolinic acid anhydride into reaction in an inert organic solvent such as tetrachloroethane, benzene, chlorobenzene, nitrobenzene and the like, or using a Friedel-Crafts catalyst such as aluminum chloride, zinc chloride, phosphorus chloride and the like. And, the pyridinecarboxylic acid derivative (V) is obtained by bringing alkoxyaniline derivative (III) and quinolinic acid anhydride into reaction as above.

The present compound may be singly used or may be used by mixing one or more color formers. The color former which can be used in combination with the present compound is, for example, crystal violet lactone, benzoyl leucomethylene blue, di-substituted fluorane compounds disclosed in the specifications of British Pat. No. 1,182,743, Belgian Pat. Nos. 815,291, 815,294, and 3,7-bisindolyl phthalide disclosed in the specification of DT-AS No. 22 59 711.

Effective use of the present compounds in pressure-sensitive copying sheets can be accomplished by following any one of the methods described in the specification of U.S. Pat. Nos. 2,800,458, 2,806,457 and so on. Application of the present compounds to heat-sensitive recording materials can be effected by any one of the methods described in Japanese Patent Publication No. 14039/1970 and so on.

The followings are the more detailed explanation of the present invention while referring to examples, however, it should be understood that the scope of the present invention is never restricted to examples shown as follows.

EXAMPLES OF SYNTHESIS

1. Synthesis of 3-(4-N-methyl-cyclohexylamino-2-methoxyphenyl)-3-(1-ethyl-2-methylindol-3-yl)-4-azaphthalide

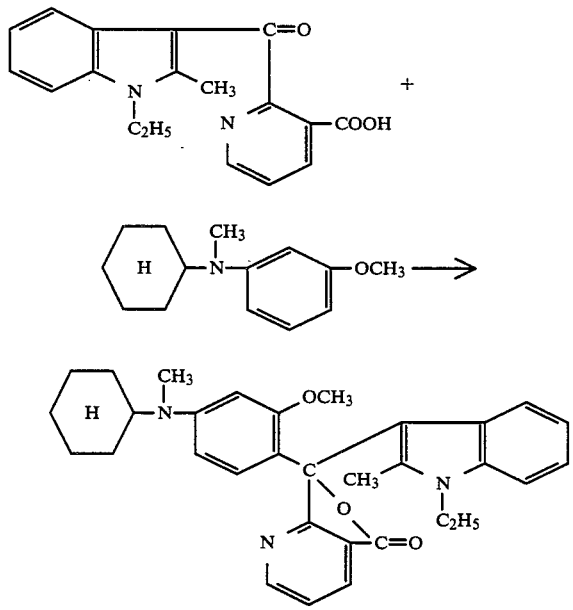

Into 60 ml of acetic anhydride, 6 g of 1-ethyl-2-methylindol-3-yl 3-carboxypyridin-2-yl ketone and 4 g of N-methyl-N-cyclohexyl-3-anisidine are dissolved and brought into reaction at 50° to 60° C. for 6 hours. After the reaction mixture is cooled to room temperature, it was poured into 500 ml of ice water to hydrolyse acetic anhyride and thereafter the resultant solution is adjusted to pH at 11 to 12 by addition of dilute aqueous solution of sodium hydroxide. Subsequently 100 ml of toluene is added and stirred to separate the toluene layer. The solid substance is obtained by distillating off toluene. The solid substance is washed with 100 ml of methanol, then filtered and dried to afford 6 g of a pale bluish green and crystalline substance having a melting point of 117.5° to 122.5° C. The compound is identified to be the titled compound.

2. Synthesis of 3-(4-N-methyl-cyclohexylamino-2-methoxyphenyl)-3-(1-ethyl-2-methylindol-3-yl)-7-azaphthalide

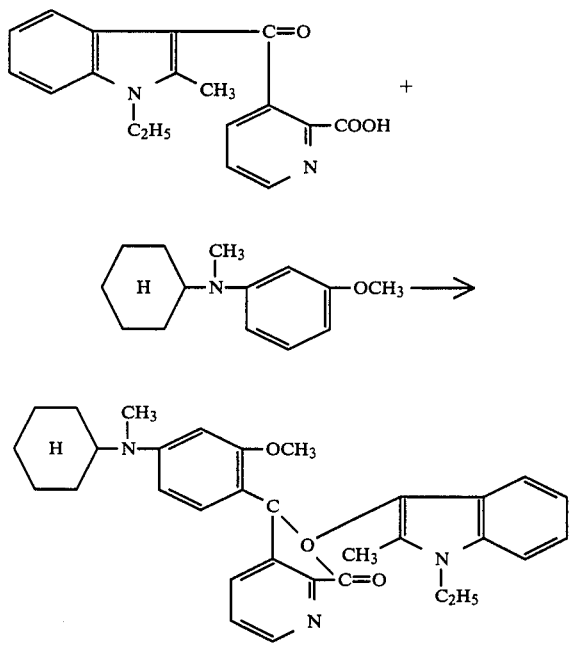

When the procedure of Synthesis 1 is repeated by using 6 g of 1-ethyl-2-methylindol-3-yl 2-carboxypyridin-3-yl ketone as a pyridinecarboxylic acid derivative and 4 g of N-methyl-N-cyclohexyl-3-anisidine as an alkylaniline derivative, there is obtained 5 g of a colorless crystalline substance having a melting point of 226.5° to 227.5° C. The compound is identified to be the titled compound.

3. Synthesis of 3-(4-N-methyl-cyclohexylamino-2-ethoxyphenyl)-3-(1-ethyl-2-methylindol-3-yl)-4-azaphthalide

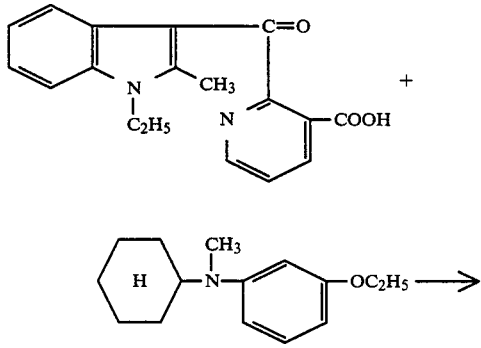

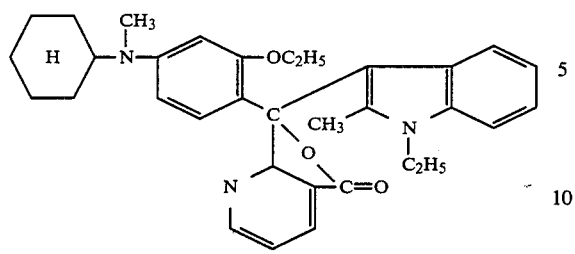

When the procedure of Synthesis 1 is repeated by using 6 g of 1-ethyl-2-methylindol-3-yl 3-carboxypyridin-2-yl ketone as a pyridinecarboxylic acid derivative and 4.2 g of N-methyl-N-cyclohexyl-3-phenetidine as an alkylaniline derivative, there is obtained 5.5 g of a colorless crystalline substance having a melting point of 141° to 146° C. The compound is identified to be the titled compound.

4. Synthesis of 3-(4-N-methyl-cyclohexylamino-2-ethoxyphenyl)-3-(1-ethyl-2-methylindol-3-yl)-7-azaphthalide

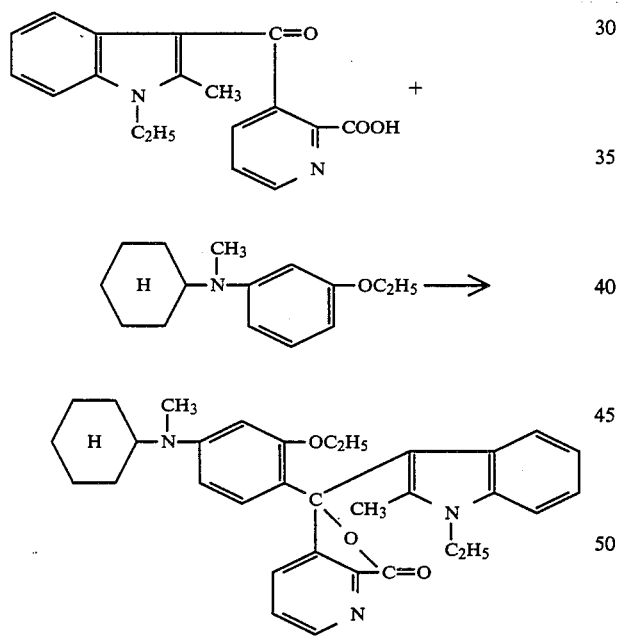

When the procedure of Synthesis 1 is repeated by using 6 g of 1-ethyl-2-methylindol-3-yl 2-carboxypyridin-3-yl ketone as a pyridinecarboxylic acid derivative and 4.2 g of N-methyl-N-cyclohexyl-3-phenetidine as an alkylaniline derivative, there is obtained 4.8 g of a pale brown crystalline substance having a melting point of 158.5° to 160.5° C. The compound is identified to be the titled compound.

5. Synthesis of 3-(4-N-ethyl-cyclohexylamino-2-ethoxyphenyl)-3-(1-ethyl-2-methylindol-3-yl)-4-azaphthalide

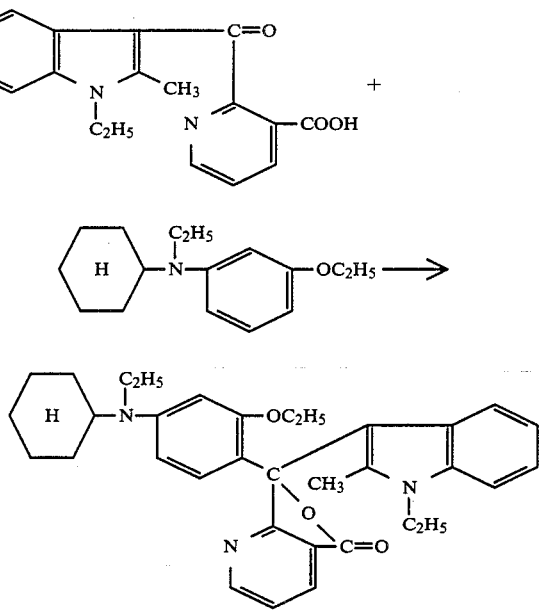

Into 60 ml of acetic anhydride, 6 g of 1-ethyl-2-methylindol-3-yl 3-carboxypyridin-2-yl ketone and 4.5 g of N-ethyl-N-cyclohexyl-3-phenetidine are dissolved and brought into reaction at 50° to 60° C. for 8 hours. After the reaction mixture is cooled to room temperature, it is treated by the same procedure as in Synthesis 1 to afford 4.0 g of a colorless crystalline substance having a melting point of 140.5° to 144.5° C. The compound is identified to be the titled compound.

6. Synthesis of 3-(4-N-ethyl-cyclohexylamino-2-ethoxyphenyl)-3-(1-ethyl-2-methylindol-3-yl)-7-azaphthalide

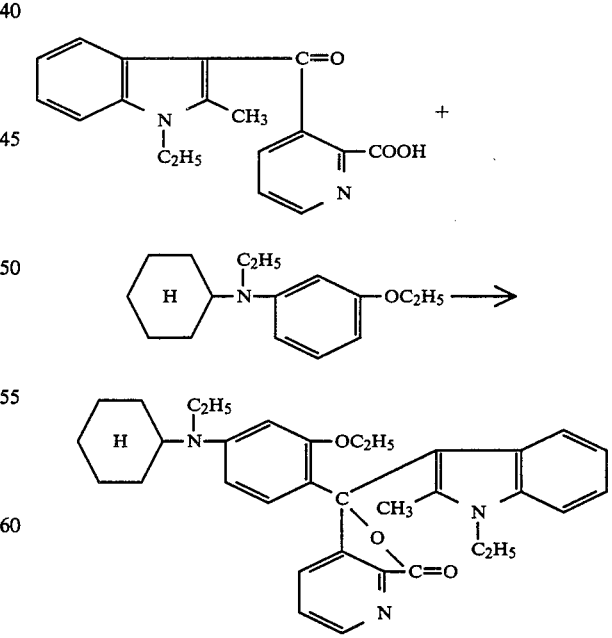

When the procedure of Synthesis 5 is repeated by using 6 g of 1-ethyl-2-methylindol-3-yl 2-carboxypyridin-3-yl ketone as a pyridinecarboxylic acid derivative and 4.5 g of N-ethyl-N-cyclohexyl-3-phenetidine as an alkylaniline derivative, there is obtained 4.5 g of a colorless crystalline substance having a melting point of 143° to 146° C. The compound is identified to be the titled compound.

7. Synthesis of 3-(4-N-methyl-cyclohexylamino-2-ethoxyphenyl)-3-(1-methyl-2-phenylindol-3-yl)-7-azaphthalide

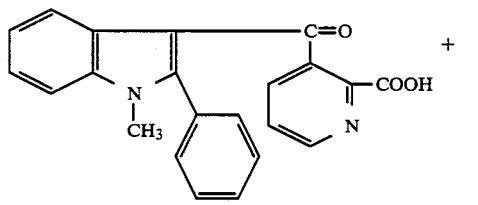
+
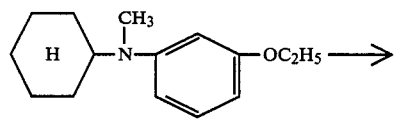
→
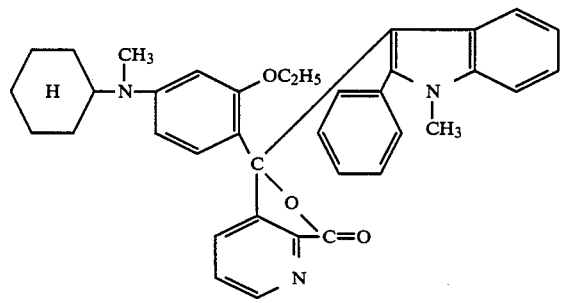

When the procedure of Synthesis 1 is repeated by using 6 g of 1-methyl-2-phenylindol-3-yl 2-carboxypyridin-3-yl ketone as a pyridinecarboxylic acid derivative and 4 g of N-methyl-N-cyclohexyl-3-phenetidine as an alkylaniline derivative, there is obtained 6.5 g of colorless crystalline substance having a melting point of 177.5° to 179.5° C. The compound is identified to be the titled compound.

As shown in the subsequent table, the present compounds synthesized according to the above-mentioned method rapidly form colors of indicated hues upon contact with acid clay.

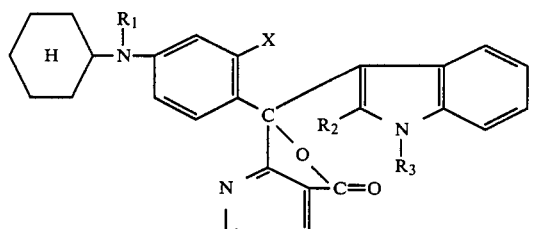

or

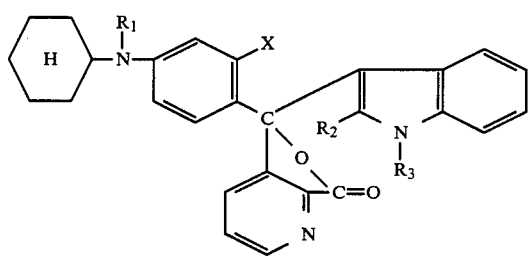

| $R_1$ | X | $R_2$ | $R_3$ | Hue |
|---|---|---|---|---|
| —H | —H | —$CH_3$ | —H | reddish purple |
| —$CH_3$ | —H | —$CH_3$ | —$CH_3$ | blue |
| —$CH_3$ | —H | —$CH_3$ | —H | blue |
| —$CH_3$ | —H | 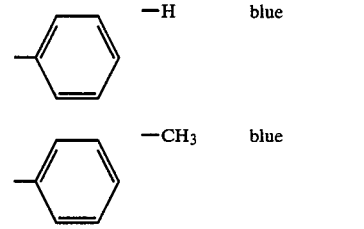 | —H | blue |
| —$CH_3$ | —H | 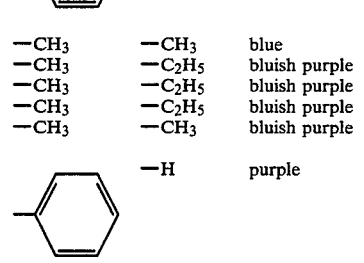 | —$CH_3$ | blue |
| —$CH_3$ | —$CH_3$ | —$CH_3$ | —$CH_3$ | blue |
| —$CH_3$ | —$OCH_3$ | —$CH_3$ | —$C_2H_5$ | bluish purple |
| —$CH_3$ | —$OC_2H_5$ | —$CH_3$ | —$C_2H_5$ | bluish purple |
| —$C_2H_5$ | —$OC_2H_5$ | —$CH_3$ | —$C_2H_5$ | bluish purple |
| —$CH_3$ | —$OCH_3$ | —$CH_3$ | —$CH_3$ | bluish purple |
| —$CH_3$ | —$OCH_3$ | | —H | purple |
| —$CH_3$ | —$OCH_3$ | —$CH_3$ | —H | bluish purple |
| —$CH_3$ | —$OCH_3$ | —$CH_3$ | —n-$C_8H_{17}$ | bluish purple |
| —$CH_3$ | —$OCH_3$ | —$CH_3$ | —n-$C_6H_{13}$ | bluish purple |
| —$CH_3$ | —$OCH_3$ | | —$C_2H_5$ | bluish purple |
| —$CH_3$ | —$OCH_3$ | | —$CH_3$ | bluish purple |

EXAMPLES OF COMPARATIVE TEST

The present compounds and compounds of prior art were subjected to a comparative test with respect to the following characteristics, a through c. Specimens used in this comparative test:

A; Crystal Violet Lactone of the structural formula shown below (known compound)

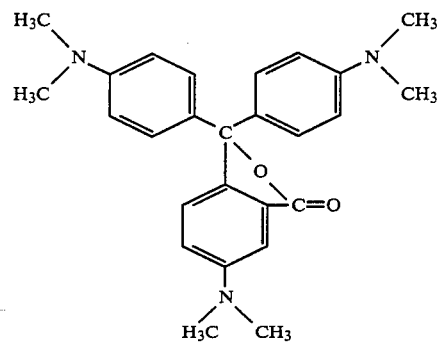

B; 3-(4-diethylamino-2-ethoxyphenyl)-3-(1-ethyl-2-methylindol-3-yl)-7-azaphthalide of the structural formula shown below (known compound)

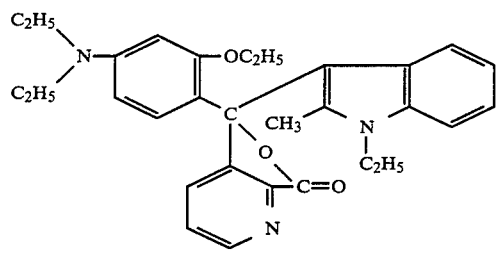

C; 3-(4-diethylamino-2-ethoxyphenyl)-3-(1-methyl-2-phenylindol-3-yl)-7-azaphthalide of the structural formula shown below (known compound)

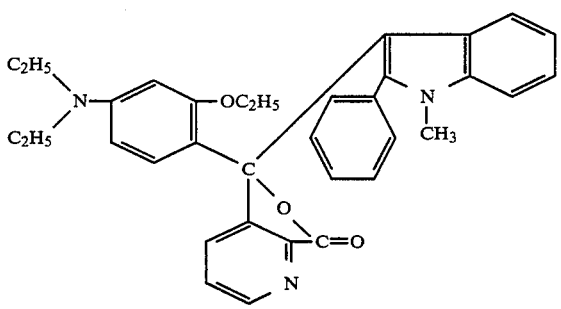

D; 3-(4-N-methyl-cyclohexylamino-2-ethoxyphenyl)-3-(1-ethyl-2-methylindol-3-yl)-7-azaphthalide of the structural formula shown below (present compound)

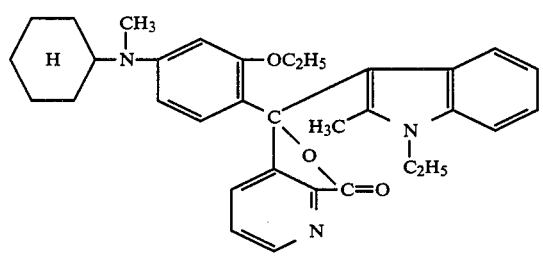

E; 3-(4-N-methyl-cyclohexylamino-2-ethoxyphenyl)-3-(1-methyl-2-phenylindol-3-yl)-7-azaphthalide of the structural formula shown below (present compound)

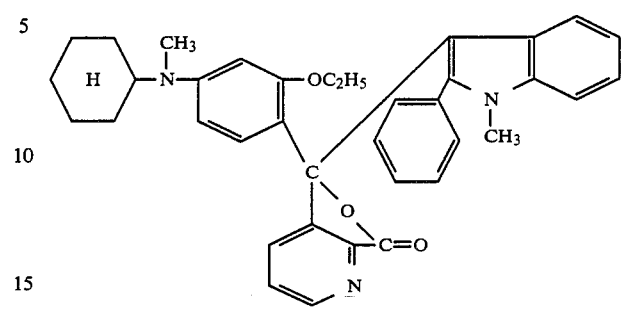

a. Light-resistivity of colored image:

A 3% KMC-113 (a solvent made by Kureha Kagaku K.K.) solution of each specimen was applied to a sheet coated with an acid clay at a rate of 1 g/m$^2$. Then the sheet thus prepared was tested for color-forming concentration by means of Macbeth Reflection Densitometer using WRATTEN filter #25 with the light exposure time varied.

The results are shown in Table 1 below.

TABLE 1

| Specimen | Light Exposure Time (hr) | | | |
|---|---|---|---|---|
| | 0 | 1 | 2 | 3 |
| A (known compound) | 1.15 | 0.90 | 0.73 | 0.60 |
| D (present compound) | 1.10 | 0.90 | 0.81 | 0.72 |

Further, the above procedure was repeated by using a sheet coated with phenol formaline resin in place of the acid clay.

The results are shown in Table 2 below.

TABLE 2

| Specimen | Light Exposure Time (hr) | | | |
|---|---|---|---|---|
| | 0 | 1 | 2 | 3 |
| A (known compound) | 1.02 | 0.60 | 0.36 | 0.30 |
| D (known compound) | 1.02 | 0.89 | 0.79 | 0.76 |

It is clear from tables that sheets applied with the present compound exhibit less discoloration due to exposure to light than those applied with compound of prior art. This fact indicates that pressure- or heat-sensitive sheets produced by using the present compounds are excellent in color forming property and resistivity to light.

b. Spontaneous color forming property in dilute aqueous acid solution:

A 2% toluene solution of each specimen (10 ml) and an aqueous 15% acetic acid solution (15 ml) were shaken vigorously for one minute and the resultant mixture was left to stand at rest. The colored aqueous solution of acetic acid was tested colorimetrically with Shimadzu spectrophotometer.

The results are shown in Table 3 below.

TABLE 3

| Specimen | Maximum Absorption Wavelength (mµ) | Absorbency |
|---|---|---|
| B (known compound) | 581 | 1.864* |
| C (known compound) | 588 | 0.586 |
| D (known compound) | 581 | 0.546 |

TABLE 3-continued

| Specimen | Maximum Absorption Wavelength (mµ) | Absorbency |
| --- | --- | --- |
| E (known compound) | 588 | 0.079 |

*The colored aqueous solution of acetic acid was diluted 5 times by an aqueous 15% acetic acid solution and tested.

The results indicate that the present compounds have very low degree of solubility in dilute acids as compared with compounds of prior art. This fact implicates that when an aqueous solution of gelatin is coagulated with a dilute acid in the preparation of microcapsules for use in the pressure-sensitive copying sheets, the present compound has little possibility of coloring the solution.

c. Spontaneous color forming property exhibited upon application to sheets of filter paper:

A 2% toluene solution of each specimen (25 µl) was dropped onto a filter paper (Toyo Filter Paper No.2) followed by air-drying. Then the paper thus prepared was tested for color density by means of Macbeth Reflection Densitometer using WRATTEN filter #25.

The results are shown in Table 4 below.

TABLE 4

| Specimen | Color Density |
| --- | --- |
| B (known compound) | 0.14 |
| C (known compound) | 0.11 |
| D (known compound) | 0.10 |
| E (present compound) | 0.08 |

It is clear from table that the present compounds are very low in the color density exhibited upon application to the sheets of filter paper as compared with compounds of prior art. This fact implicates that when the compound is finely divided and mixed such as with Bis-Phenol A to prepare a coating material for application to heat-sensitive sheets or heat-sensitive recording sheets, the heat-sensitive sheets or heat-sensitive recording sheets produced by using the present compounds experience little coloration of texture and are free from spontaneous coloration.

EXAMPLES OF APPLICATION

Example 1

In 100 ml of monoisopropyl biphenyl was dissolved 3 parts of 3-(4-N-methyl-cyclohexylamino-2-methoxy-phenyl)-3-(1-ethyl-2-methylindol-3-yl)-4-azaphthalide. The resultant solution was emulsified by addition of a solution of 20 parts of gum arabic in 160 parts of water. The emulsion was stirred with 20 parts of acid-treated gelatin and 160 parts of water added thereto, with the resultant mixture adjusted to pH 5 by addition of acetic acid. Subsequently, the mixture was subjected to coacervation in the presence of 500 parts of added water, with the result that a thick gelatin-gum arabic dope deposited in the form of coating film around the oil droplets of the color-forming compound dissolved in the solvent. The mixture was then adjusted to pH 4.4 and then mixed with 3.8 parts of an aqueous 37% formalin solution to solidify the liquid film mentioned above. It was then cooled to 10° C., adjusted to pH 9 by addition of an aqueous sodium hydroxide solution and left to stand at rest for five to six hours so as to enable the capsulation to proceed to perfection. The capsulated liquid thus obtained was applied to a sheet and dried. This sheet was brought into tight contact with a sheet coated with acid clay as an acidic electron-accepting adsorbent. When the paired sheets were exposed to the pressure applied by the tip of a ball-point pen or to the impact exerted by the types of a typewriter, an image of a bluish purple color appeared on the acid clay surface. The colored image showed high resistivity to light.

Example 2

With 150 parts of an aqueous 10% polyvinyl alcohol solution and 65 parts of water, 30 parts of 3-(4-N-methyl-cyclohexylamino-2-ethoxyphenyl)-3-(1-ethyl-2-methylindol-3-yl)-4-azaphthalide was mixed and disintegrated to form "Component A". After this disintegration, this azaphthalide was found to have a particle diameter of 1 to 3 microns. Similarly, 35 parts of Bis-Phenol A, 150 parts of an aqueous 10% polyvinyl alcohol solution and 65 parts of water were mixed and disintegrated for one hour, to produce "Component B". After the disintegration, Bis-Phenol A was found to have a particle diameter of 1 to 3 microns.

Subsequently, 3 parts of Component A and 67 parts of Component B were mixed. The resultant mixture was spread on a sheet of paper and dried to produce a heat-sensitive recording sheet. The mixture in this case was applied at a rate of about 5 g/m². When the heat-sensitive recording sheet thus obtained was exposed to heat applied by a heat pen, it instaneously formed a bluish purple color. The colored image showed high resistivity to light.

What is claimed is:

1. A chromogenic compound of the formula:

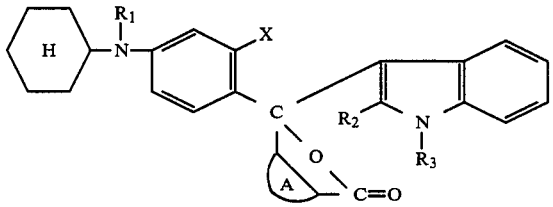

where A is a pyridine ring forming a 4- or a 7-azaphthalide group; $R_1$ is a hydrogen atom or an alkyl radical of from 1 to 4 carbon atoms; X is a hydrogen atom, an alkyl radical of from 1 to 2 carbon atoms or an alkoxy radical of from 1 to 2 carbon atoms; $R_2$ is an alkyl radical of from 1 to 2 carbon atoms or a phenyl radical and; $R_3$ is a hydrogen atom or an alkyl radical of from 1 to 8 carbon atoms.

2. The compound according to claim 1, wherein $R_1$ and $R_2$ are each methyl, X is methoxy and $R_3$ is ethyl.

3. The compound according to claim 2, which is 3-(4-N-methyl-cyclohexylamino-2-methoxyphenyl)-3-(1-ethyl-2-methylindol-3-yl)-4-azaphthalide or 3-(4-N-methyl-cyclohexylamino-2-methoxyphenyl)-3-(1-ethyl-2-methylindol-3-yl)-7-azaphthalide.

4. The compound according to claim 1, wherein $R_1$ and $R_2$ are each methyl, X is ethoxy and $R_3$ is ethyl.

5. The compound according to claim 4, which is 3-(4-N-methyl-cyclohexylamino-2-ethoxyphenyl)-3-(1-ethyl-2-methylindol-3-yl)-4-azaphthalide or 3-(4-N-methyl-cyclohexylamino-2-ethoxyphenyl)-3-(1-ethyl-2-methylindol-3-yl)-7-azaphthalide.

6. The compound according to claim 1, wherein $R_1$ and $R_3$ are each ethyl, X is ethoxy and $R_2$ is methyl.

7. The compound according to claim 6, which is 3-(4-N-ethyl-cyclohexylamino-2-ethoxyphenyl)-3-(1- ethyl-2-methylindol-3-yl)-4-azaphthalide or 3-(4-N-ethyl-cyclohexylamino-2-ethoxyphenyl)-3-(1-ethyl-2-methylindol-3-yl)-7-azaphthalide.

8. The compound according to claim 1, wherein $R_1$ and $R_3$ are each methyl, X is ethoxy and $R_2$ is phenyl.

9. The compound according to claim 8, which is 3-(4-N-methyl-cyclohexylamino-2-ethoxyphenyl)-3-(1-methyl-2-phenylindol-3-yl)-4-azaphthalide or 3-(4-N-methyl-cyclohexylamino-2-ethoxyphenyl)-3-(1-methyl-2-phenylindol-3-yl)-7-azaphthalide.

* * * * *